Dec. 22, 1959     G. G. HOBERG ET AL     2,918,658
FORMAT CONTROL FOR HIGH SPEED PRINTERS
Filed Feb. 28, 1956     5 Sheets-Sheet 1

INVENTORS
GEORGE G. HOBERG
WILLIAM R. LONERGAN
DONALD L. STEVENS
ROBERT B. THORNLEY
ROBERT J. WILLIAMS
BY Laurence R. Brown
ATTORNEY Dec. 22, 1959  G. G. HOBERG ET AL  2,918,658
FORMAT CONTROL FOR HIGH SPEED PRINTERS
Filed Feb. 28, 1956  5 Sheets-Sheet 2

*INVENTORS*
GEORGE G. HOBERG
WILLIAM R. LONERGAN
DONALD L. STEVENS
ROBERT B. THORNLEY
ROBERT J. WILLIAMS

BY Lawrence R. Brown
ATTORNEY

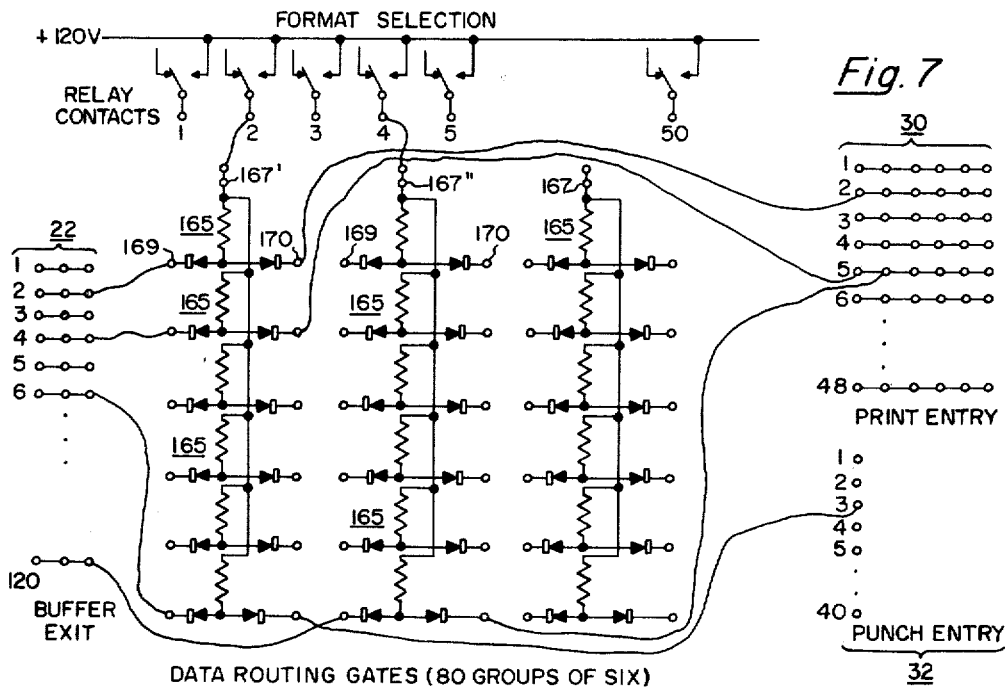
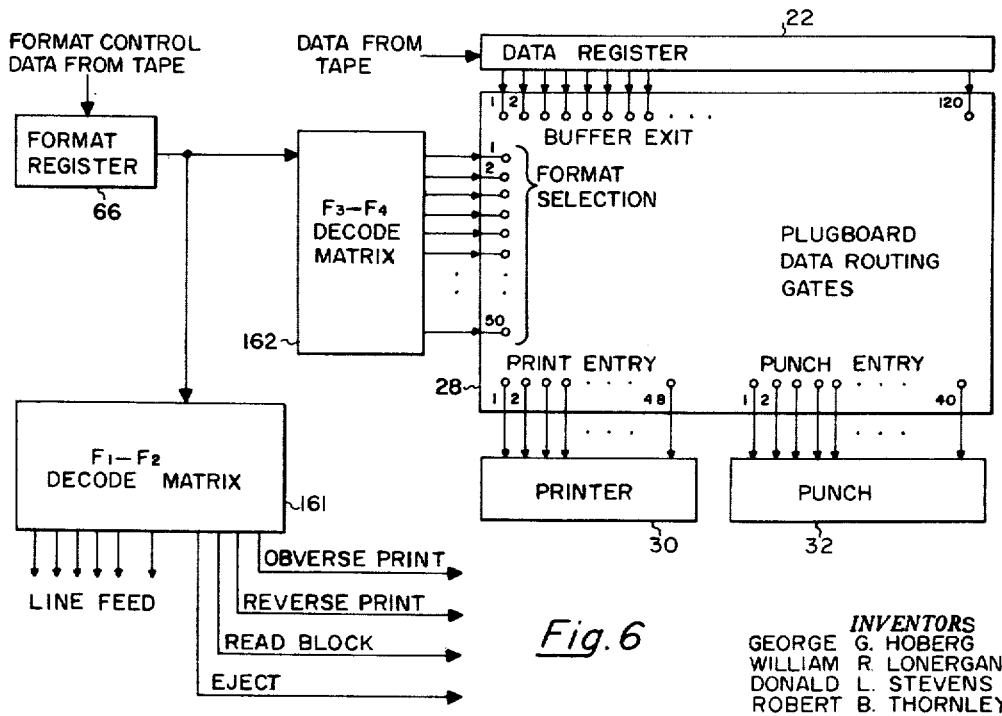

United States Patent Office 2,918,658
Patented Dec. 22, 1959

2,918,658
FORMAT CONTROL FOR HIGH SPEED PRINTERS

George G. Hoberg, Berwyn, William R. Lonergan, Bryn Mawr, Robert B. Thornley, Flourtown, Robert J. Williams, Berwyn, and Donald L. Stevens, Broomall, Pa., assignors to Burroughs Corporation, Detroit, Mich., a corporation of Michigan Application February 28, 1956, Serial No. 568,228

8 Claims. (Cl. 340—174)

This invention relates to electronically controlled business machines and more particularly to means and methods for producing recorded documents from stored information with the format of the information on the output document being automatically controlled.

In preparing output documents such as punch cards and/or post cards which are both printed and punched for use in billing utility accounts or the like, it is desirable to provide flexibility of recording format control so that each successive card may be presented in a different type of format. For example, in passing through a succession of utility accounts, it is convenient to have different formats for accounts representing customers who have only an electric meter as compared with those customers who have both electric and gas meters. Since it is usual to pass through account numbers in numerical order, without selecting particular types of accounts for separate operations requiring only a single format, it is thereby desirable that there should be some provision for causing a business machine to automatically select the proper format associated with each account without having to separate out those accounts having different format requirements for separate reproduction runs.

In a system including a machine designated to select different formats for different types of accounts, it is also desirable to provide both maximum output printer or punch speed and input storage volume efficiency which also represents higher input speeds because of the requirements for less scanning and reading time. Thus, it is not desirable to set up a format control which requires the printer to pass through a larger number of positions such as lines or spaces than those which will actually be used. It is well known that in most business machine applications, the internal computations and data processing may take place more quickly than they may be handled by the output printer or recorder. Accordingly, extra output printer cycles which are necessary in machine operation to handle exceptional format conditions tend to be costly in terms of overall machine processing speeds. Accordingly, the machine should be able to produce different output document formats consecutively without requiring the printer to cycle through unnecessary operations such as required to eject a document for a later reproducing run set up for an alternative format.

In many types of billing for modern data processing machines, it is desirable to print at least some of the same information upon a post card bill and punch card stub account, so that the stub may be torn off and mailed back for automatic processing of the account and the bill may be maintained by the customer for his records. It is desirable, therefore, in format control operations to print the same information upon different portions of the same line, or to print the same information on different lines. In the interest of system efficiency information must be processed without requiring more than a single pass of the information storage medium or the output document, since the data processing operations may be quickly accomplished in most cases much faster than the reading of information from a large bulk storage bin or the positioning of a document form. Thus, an efficient system must be capable of retaining information so that the same data may be rearranged by recording upon more than one line or in separate positions along the same line of the output document without rereading the input storage or repassing the output document.

The input storage medium capacity of a large system is decreased considerably when requiring the information to be recorded for each entry in the order in which it is transferred to the output document. Thus, the requirement for printing the same information in the same line may be costly in terms of storage capacity and scanning time when the information in the input memory medium is stored in the order into which it is transferred into the output document. This requires the redundant storage of the same information. Therefore, the format control system should be such that the information need be recorded only once upon the input storage medium and may be transferred in variable order to any position upon the output document in a sequence upon the input storage medium independent from that upon the output document.

In this mode of operation, therefore, system efficiency is improved in several ways, since otherwise it is necessary to cause the means for recording information on the input storage medium to edit the information into the proper sequence for the presentation of a single output document. This editing procedure may require the passage of information through a large scale business data processing system during a separate run solely for editing and sequencing of information so that it is suitable for operating the output recording system. With a flexible format control system, however, information may be utilized from a single storage medium for producing an output format which is independent of the order of the entry in the input storage medium. Thus, the information originally placed upon an input storage medium entry may be used without editing for providing different output document formats during the same or different data processing runs. For example, it may be desirable to print out simultaneously from a "raw" computer output tape a utility billing run and a daily journal, where the journal can provide information upon the utility bills in a different arrangement. In this type of operation, therefore, the journal information need not be recorded also upon the input medium in a prepared sequence but would be processed by the format control system for arrangement in the proper form by selecting and distributing the information available in the single utility billing entry. Such an operation provides overall system advantage in that the same sequence which is necessary for operation of a computation cycle may be used directly for reproduction of an output document in a specified format arrangement, without requiring the computer to edit or reorient the information.

It is, accordingly, a general object of the invention to provide improved data processing systems and methods capable of providing separate format arrangements for each successive record entry on an output document.

Another object of the invention is to provide methods and systems for producing output documents from an input storage medium wherein the information is presented to the output document in different order from that presented by the storage medium.

Another object of the invention is to provide an efficient data processing system which provides high speed preparation of output documents without requiring unproductive data processing.

A further object of the invention is to provide systems and methods for providing upon different output documents singular formats of data from common data entries recorded in a storage medium, wherein the order of presentation of the different format entries to the output document may vary as well as the location of information upon the document.

Therefore, in accordance with the present invention, there is provided a data processing system which produces output documents, such as post card utility bills containing recorded stubs having both printed and punched information, from a series of records or accounts recorded upon a bulk storage medium such as magnetic tape. Each of the accounts is identified upon the recording medium so that it may be selectively chosen for preparation of a bill or statement. To specify a data extraction pattern unique to each data entry, record or account there is also designated upon the tape a format control entry for the account, if desired, or for whichever accounts may represent a variation from a specified format arrangement. In order to interpret the format control entry, means is provided for buffer storage of both the format entry and the data entry as read from the input tape, so that the same information may be utilized whenever required for entry at different positions or in different sequence upon the output document. Thus, a data entry identifying the account number may be called from the buffer storage for printing upon the bill and for both printing and punching upon the stub of a post card. The format control entry, therefore, is used to specify the extraction and distribution of the account information. The system is also provided for flexible operation in that the format entry may specify several different modes of format operation for use while performing different independent data processing operations. Thus, routing means is provided such that the separate formats may be produced upon different output documents either during the same pass of information, or during successive passes such as required, for example, in taking a separate inventory run or a daily balance. Different aspects of the system are claimed in this application and a further application, S.N. 568,229, filed the same day as this application.

Other objects and features of the invention will be found throughout the following detailed description of the invention and its operation which is described in connection with the accompanying drawings wherein:

Fig. 6 is a block system diagram of the control system for preparation of an output document; and Fig. 7 is a circuit diagram of a format selection routing plugboard used in interpreting format control information for use by an output recording system.

Figure 1:
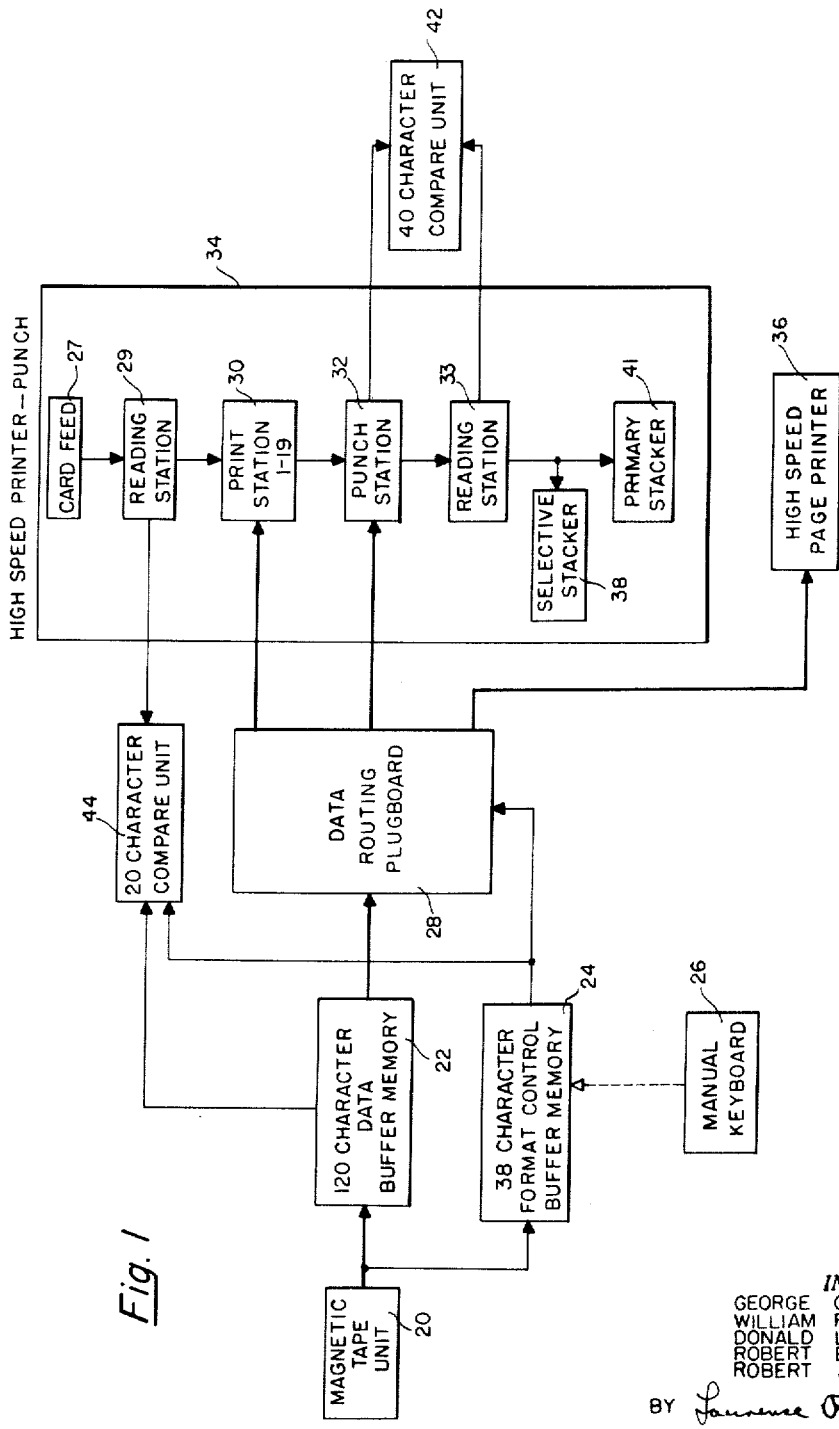
Fig. 1 represents a block diagram of a system incorporating the invention.

Throughout the figures, like features are designated with similar reference characters in order to facilitate comparison. In general, the different circuit features are shown in block diagram form to simplify the presentation and understanding of the novel features of the invention because the circuits shown are well known and in most instances may be replaced by equivalent circuits without destroying the identity of the system. Accordingly, it is evident from the detailed description of the invention and its mode of operation that the same principles could be applied to other computers or data processing systems in modified form without necessarily departing from the spirit or the scope of the present invention.

In Fig. 1 is shown the general orientation of a data processing system arranged in accordance with the teachings of the present invention. Thus, it is presumed that the bulk storage of data is available from the rolls of magnetic tape which are processed and read by the magnetic tape unit 20. The magnetic tape which is processed by the unit 20 may be of the form shown in Fig. 2, wherein it is presumed that the reading takes place on the tape 18 from the entries on the left toward the entries on the right as indicated by the arrow. It is seen that the tape has a binary coded control signal (BF), indicating the beginning of a block of recorded format control information, as may be identified by the code 010010. As indicated in dotted outline, this code may be replaced by a further code entry BB which indicates the beginning of a data block entry without format signals. The beginning of block signal BB, therefore, may indicate that the account to be read out is contained in the subsequently presented tape entry that occurs before the end of the block signal EB, which is coded 010001 for example. To designate the end of a particular data processing run a coded symbol 000001 indicating the end of file may be used. Immediately after the start of the block of information a format entry occurs comprising a plurality of characters which may be represented in a specific embodiment such as described hereinafter by 36 binary coded decimal digits. At the end of this entry is a further control signal known as end of format signal EF in binary coded form 110000, and which may be replaced by the begin block signal BB in the absence of format digits. The format digits may each comprise a similar binary coded signal of six bits. Since the six bits, which are representative of one character or one digit, provide a maximum possible number of characters or digits equal to 64, alphameric storage of information with the additional control signals indicated on the tape is possible. Each character or digit, therefore, takes up a single line of 6 bits of information, and may be accompanied by a further binary check digit if desired. Thus, the 120 character or digit data entry block following the end of format signal EF provides a storage bin for placing information pertinent to a particular record account.

Obviously, in different systems the coding arrangement may be changed or the size of the storage entries may be varied without changing their functional relationship. It is important, however, that in the system herein proposed, a multiple character or digit format entry be designated for identifying the desired arrangement of the information in the data entry upon an output document and for automatically controlling the required format operations of extraction and data routing built in a particular machine. Provision must be made in most practical billing operations so that each consecutive block of recorded information may have provisions to print out in different format arrangements if it is desired to save computer runs for the purpose of separating those accounts requiring a single format arrangement. Thus, the arrangement of information upon each account may be printed in different order as specified by an accompanying format entry. As will be hereinafter discussed, variations from this mode of operation may be accomplished where it is desirable to save storage space upon the tape by omitting unnecessary format information.

The information thus presented upon the tape is channeled by means of the recorded control signals on the tape into respective data and format buffer memory devices 22 and 24 which are of enough capacity to retain the maximum number of digits provided for in the respective entires. It is noted that provisions are made for storing a maximum number of 36 alphanumeric characters or digits for the format and 120 characters or digits for the data in the proposed system, but only that number of characters actually necessary for the particular entry of data and format information need be written upon the tape because of the presence of the control signals at the start and finish of each entry.

For operation under conditions where it is not necessary to change the format from one entry to the next or where it is desirable to enter a change in format information in case of loss of format information or updating of an entry, a manual keyboard 26 is provided for reading into the format buffer memory the necessary format control characters. Control circuits are also provided for causing the buffer memory to retain this information for use with an entire data processing operation requiring a large number of data block entries if desired to process records not having format entries. Thus, the end of file signal 000001 might be used to indicate that the keyboard entry need no longer be retained in the buffer memory, and the beginning of block signal BB might be used to initiate each account analysis rather than the beginning of format signal BF.

In order to provide a reasonable amount of flexibility with a minimum amount of format control information upon the magnetic tape 18, a data routing plugboard 28 is provided for manually wiring in a specified amount of the format control information in the form of specifying a plurality of optional data routing paths. Generally the plugboard is utilized in order to save a large amount of control equipment, and in the system hereinafter described in more detail, it will be pointed out that certain advantages in operation exist because of the selection of specific functions performed respectively by the format control characters and the wired in plugboard instructions. The plugboard routing determines which of the three output recorders 30, 32 or 36 will receive information from the data buffer memory 22. Thus, the print station 30 and punching station 32 of the high speed printer punch system 34 may receive those portions of the data in the buffer memory 22 which are designated by specified ones of the format control characters or digits in buffer memory 24. Likewise, the high speed page printer 36 may receive information from the buffer memory either at the same time or on a different tape reading cycle in a different format arrangement as specified by the format control characters and the data routing plugboard. Thus, with this system it is possible to produce both a printing and punching operation and to carry along a daily journal summarizing the information upon the processed accounts while making a single pass of the magnetic tape by the tape unit 20.

It is to be recognized that the format control may be utilized with various forms of output document preparation devices such as card printers and card punches or page printing devices. The high speed printer punch arrangement exemplified by block 34 herein contains provisions for card feeding, pre-reading, printing and punching, post-reading and stacking in the sequence specified at the respective stations 27, 29, 30, 32, 33 and 38 or 41. The printing station 30 may, for example, be that incorporated in a high speed printer of the type described in the U.S. No. 2,632,386 issued on March 24, 1953 to J. J. Hyland, and may be used for printing upon a punched card document in the manner described in the U.S. Patent Nos. 2,653,534 and 2,708,020 issued respectively on September 29, 1953 and May 10, 1955 to W. Wockenfuss. Further features of a typical recording system are described in the copending application entitled "Recording Control of Selectively Decoded Data" filed July 3, 1953, Serial No. 366,043 for G. B. Heddendorf and E. N. Di Giulio, and assigned to the same assignee as the present application. Thus, the printing and punching operations of the printing stages 30 and 32 and the printing operation at the high speed page printer 36, may be accomplished with well known equipment.

The printer-punch system is capable of feeding cards past a pre-reading station 29 performing a print and punch operation at units 30 and 32 as signified by the input data processing system, checking the operation at a possible post-reading station 33 for error indication by means of a forty character compare unit 42 and stacking the cards in an order designated by data processing control signals in either the selective stacker 38 or primary stacker 41. Thus, reject cards which did not pass the compare operation at unit 42 because of a punching error could be ejected by the selective stacker unit 38. The format control operation discussed in connection with the embodiment of the invention described hereinafter is designated for operation with this particular type of high speed printer punch system, although it is to be recognized that the same general operational principles would apply should other output document recording systems be used. One particular feature possible with the described high speed printer punch system 34, is that of being able to compare input punched card documents at reading station 29 with input magnetic tape data entries stored in the buffer memory device 22. Thus, the account number which has been pre-punched into a card may be matched with the account number of a data entry on the tape whenever there is not a one-to-one match between cards and tape entries. The arbitrarily chosen twenty characters or digits of the compare unit 44 may be designated for comparing other information if desired. The compare unit is used selectively as specified by a particular group of the format control digits located in the buffer memory unit 24. This feature is included since for certain operations such as the lack of pre-recorded punch cards it might not be necessary to operate with an account comparison.

Figure 3:
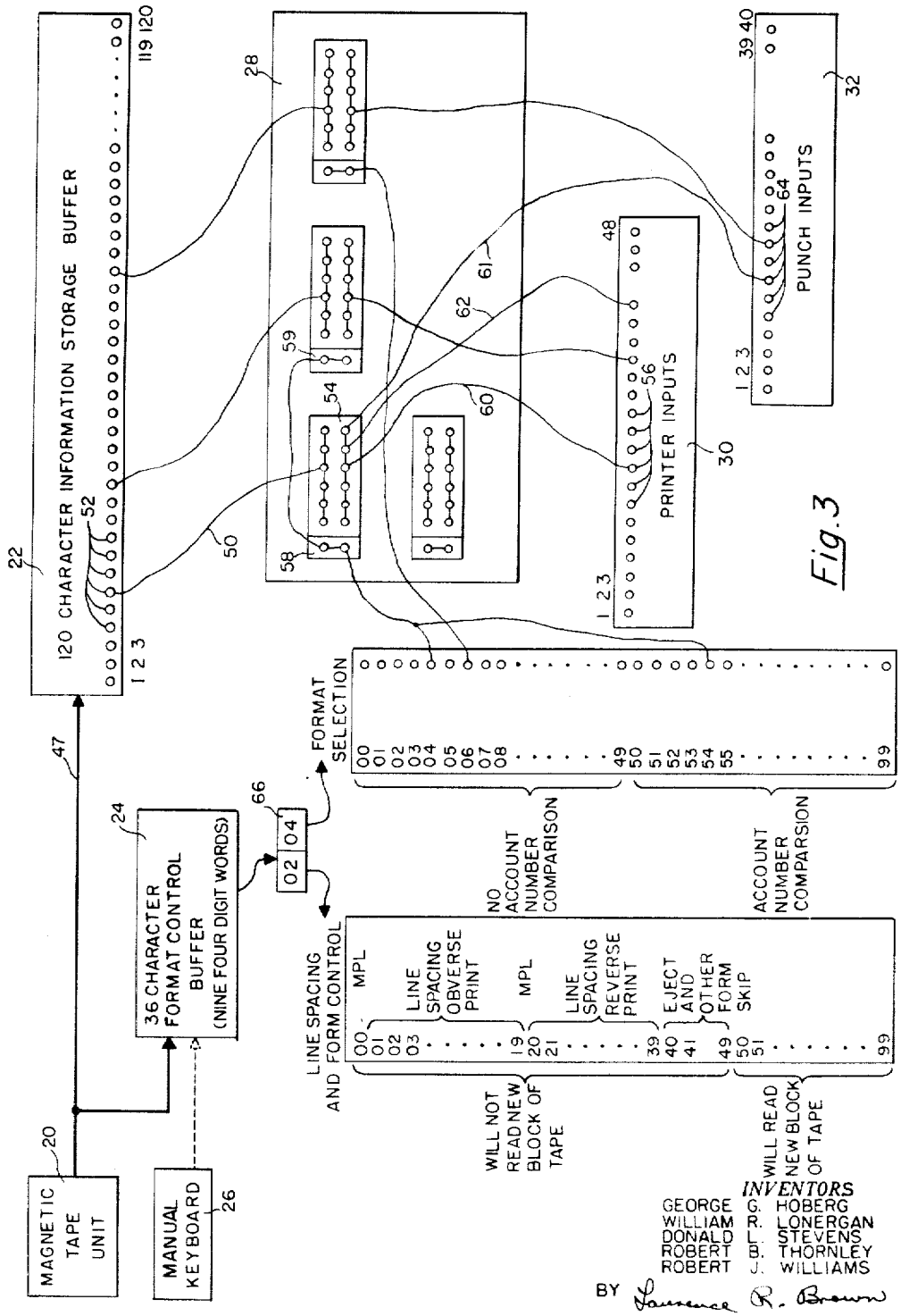
Fig. 3 is a block system diagram diagrammatically illustrating the manner of utilizing format control information to provide specified orientation of information on output documents.

A more detailed representation of the format control system, provided by the present invention in a system such as described, is diagrammatically illustrated in Fig. 3. In this representation, in order to simplify the description, the format control is discussed only in connection with the printer and punching stations 30 and 32 respectively of the high speed printer punch device. It is evident that likewise the high speed page printer 36 (Figure 1) could be directed by means of the plugboard and format control for similar preparation of output documents in any desired format form. By way of example, it is assumed that the printer will handle forty-eight characters or digits per line, and the punch input will handle forty columns per line. Likewise, it is assumed that the one hundred and twenty character or digit information storage buffer provides parallel output of the one hundred and twenty stored characters or digits. Thus, the storage buffer might, for example, comprise a shift register if it were desirable to read information serially from the tape unit 20 into the buffer unit 22 by means of input lead 47. It is to be recognized, however, that another storage medium such as a magnetic drum or magnetic matrix memory may be utilized as a buffer storage device as long as there is means for entering information from the magnetic tape unit 20 and for identifying any of the one hundred and twenty stored characters or digits for distribution through the plugboard 28. In the particular system described herein, the plugboard 28 designates the position which the respective characters or digits in the data buffer memory 22 will take along the printer or punch lines provided by units 30 and 32.

To simplify the presentation, a diagrammatic representation is made of the plugging of several characters or digits of information, and the arrangement of the information in the respective units. For example, the plugboard wire 50 is passed from one of several connections 52, representing characters in the data buffer memory 22, and likewise entered in a plugboard panel 54 which permits coupling to position 56 in the printer 30. Each bit storage position, for simplicity, is not shown in the buffer 22, but it is to be understood that each of the character or digit positions 52 stores a plurality of binary bits representative of that alphameric character or digit.

Similarly, all of the bit positions in the printer station 30 and punch station 32 are not shown. The plurality of format digits or characters designating printing positions is available to permit routing of the same character to several different positions along a line or to different lines, if desirable. Likewise, each plugboard panel 54 is provided with a further interconnection plugboard section 58, which permits gating of data through the section 54, and control of several panels by means of a single format character lodged in the format control buffer 24 is possible through interconnecting leads such as shown between sections 58 and 59. This arrangement, therefore, provides considerable flexibility in the formation of different arrangements of data characters along the printed line or punched line as selected under control of the format characters. Thus, consider the character at connections 52 of the storage buffer 22 which is passed by plugboard wire 50 to the plugboard panel 54. This character is likewise passed upon receipt of a gating signal at section 58 by means of plugboard wire 60 to identify respectively a particular position along the forty-eight character printing line as identified by connections 56 in the printer 30, and a particular position along the punching line by plugboard wire 61 as identified by connections 64 in the punching station 32. The same character is likewise passed to a further character position along the printing line in the printer unit 30 by means of the plugboard wire 62. Thus, it is evident that any character in the data storage buffer means 22 may be passed to any printer or punch line position by means of the plugboard unit 28. Accordingly, redundant storage of information upon the tape is unnecessary even when it is desired to reproduce the same information in different locations.

Each of the plugboard panels 54 together with section 58 constitutes a gate, which will be described in more detail hereinafter in connection with the description of Fig. 7. The gate permits passage of information only upon receipt of a control signal at the plugboard section 58 as specified by a format control entry. Thus, consider a format control word of four decimal digits represented diagrammatically by the format word in block 66. The format selection 04 (or the alternate selection 54) therefore would designate actuation of the gates by means of control signals at the plugboard sections 58 and 59 and thereby would gate the corresponding characters in the data buffer memory 22 into their specified printing and punching positions. By means of the nine separate four digit words contained in the thiry-six character or digit format control entry, each available for a separate line printing cycle, the information in the one hundred twenty character data storage buffer 22 may be printed on a maximum of nine separate lines. Should presentation upon only three lines be necessary, only three format words would be used in the mode of operation disclosed in the present embodiment. It is obvious that those skilled in the art can select arbitrarily different numbers of format control words, or larger format control words to perform different functions than those specified herein or to satisfy the requirements of a computer or data processing system other than that used herein to illustrate the operation of the present invention. For example, further format control digits could be used rather than the plugboard to specify the position of information along the printed line if desired, or alphameric characters could be utilized rather than decimal digits as format control characters in order to provide more available format control information. Thus, the particular control features desired depends more or less upon the arbitrary designations of those who determine the qualifications of a particular data processing system.

In this particular system, fifty of the different decimal characters provided in the format word are utilized for designating fifty different possible channels through the plugboard 28 for conveying information from the one hundred twenty character buffer memory 22 to the printer and punch stations 30 and 32. Since one hundred different decimal digits are contained in the two digit format selection character in the right hand section of block 66, a redundacy occurs so that it is possible to also specify whether the account number comparison, described hereinbefore in connection with the compare unit 44 of Fig. 1, should be made. Since the format selection will be set up at the time when it is known whether there is a card account number or other data which should be matched with tape entries, it is a simple matter to add fifty to the format number when an account comparison is desired. Thus, the same format selection is specified by both numbers 04 and 54 and the latter signifies an account comparison. Certain computer details which may be used in performing operations disclosed in this application in block diagram form, such as the matter of operating a computer or data processing channel only in response to a favorable comparison producing an error-free signal, are well known and described in many publications. Specific examples are described, for example, in the copending U.S. application, Serial No. 492,062, filed March 4, 1955 for Electronic Computer System by the common assignee of this application.

The first two digits of the format control word to the left of the block 66 are used for line spacing and form control functions in this embodiment. The first fifty decimal digits are redundant with the second fifty control digits, as in the format selection arrangement. This redundancy is used for the first two decimal digits to indicate whether a new block of tape should be read into the data processing system from the magnetic tape unit 20. The new block of tape may or may not contain a format entry. Thus, if it is desired to print more than one hundred twenty characters on a specified account card, the first two format control digits of one of the particular format words in the sequence of nine will so designate without necessarily requiring the reading of a further format digit. Thus, it is evident that data storage flexibility is maintained while no more than the required format data need be entered upon the magnetic tape and accordingly good tape storage capacity is maintained. Conversely, however, should new format information be required as to the case when printing is required on a large number of lines, the format information may be included upon the tape in a subsequent block for the same or a succeeding block of data information even when it includes information relating to the same account. A further control signal designated a begin record BR signal therefore may be used for specifying accounts and causing the account processing or printing operation to begin wherever accounts exist containing more information than allowable in a single block.

Different operations available in the printer and printer punch units are indicated by means of different format arrangements of the first two decimal digits of each word. Thus, the digits 00 and 50 designate that the printer should not space to the next line. This operation may be termed a skip or a multiple print line (MPL) operation. Likewise, the spacing of any number of lines from 1 through 19 may be specified by the decimal characters 1 through 19 or 51 through 69. With different printing devices this instruction might vary should it not be possible to skip an entire 19 lines without losing a printing cycle, since in the specified system each format word designates a single printing cycle and therefore represents those functions which may be accomplished while a single line is being printed. In the printer punch system identified in the above mentioned patent application, provision is made for printing on both sides of a post card utility bill by the same printer mechanism at the same printing station. Thus, by providing redundant line spacing characters, the orders for obverse and reverse printing specified by the corresponding format numbers 1 through 19 or 20 through 39 may indicate the selectable use of this feature. Various other printer control functions such as document eject may be accomplished by the miscellaneous format control numbers 40 through 49, and the number 50 is added to the numbers 00 to 49 for designating that the additional function of reading a new block of tape will be performed. It is, therefore, evident that in the proposed system, information may be taken from the information storage buffer in any order and presented in any desired format to the printer or punch or both simultaneously by a corresponding automatic control system.

Figure 4:
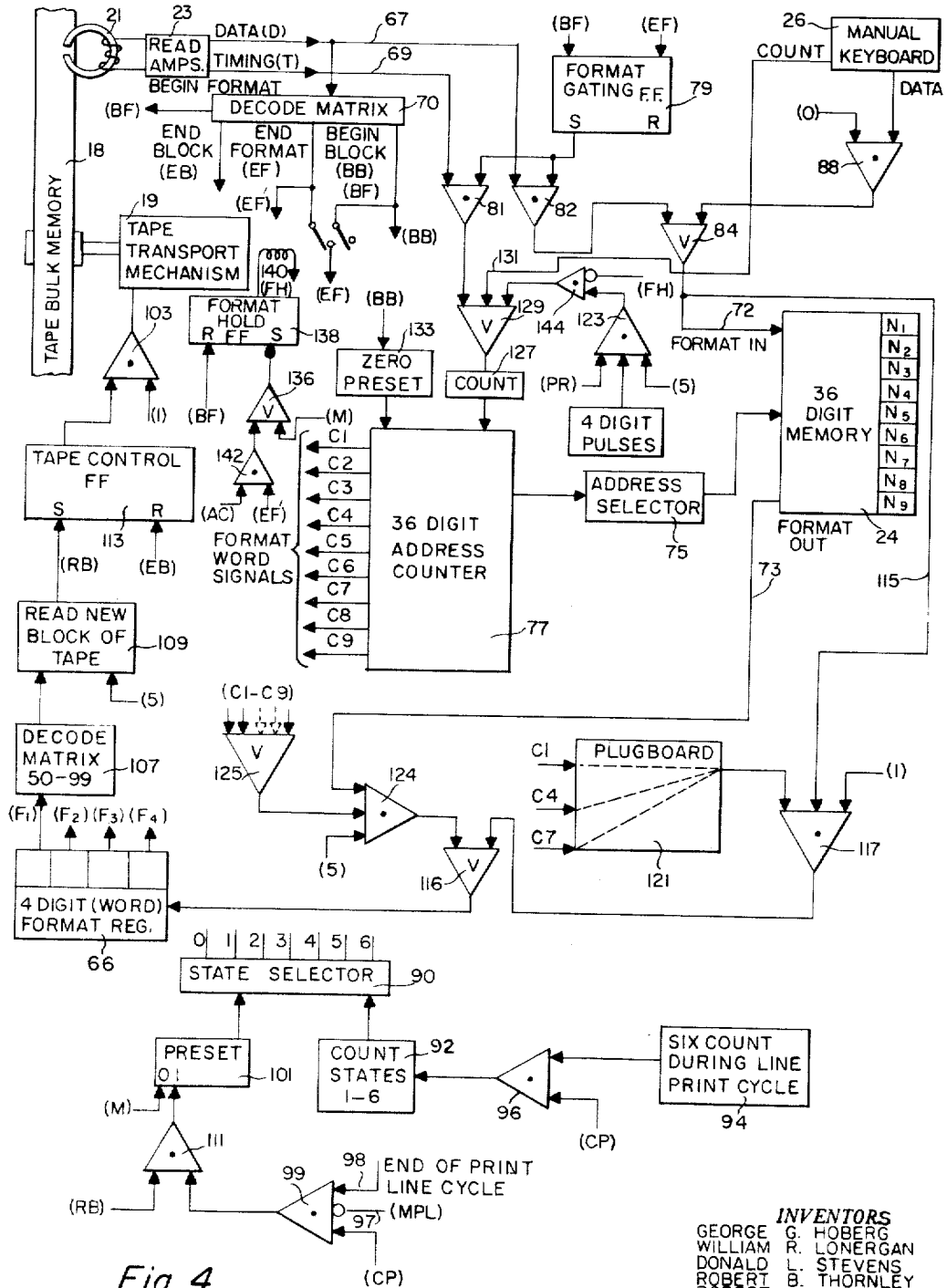
Fig. 4 is a detailed system diagram of a format control and buffer memory system.

Such a control system for operation with the data processing procedures hereinbefore described is shown in Fig. 4. Since each of the circuits contained in the control system are well known in existing computer systems and in computer patents and literature, they are shown in block diagram form in order to more particularly point out the nature and scope of the present invention, and to enable an understanding of the computer control system without consideration of numerous irrelevant details. To further simplify the presentation of the control system, it is assumed that each data entry is a decimal or alphanumeric digit, which may comprise six binary bits recorded as separate spots on the tape bulk memory. However, the detailed control systems of timing and presentation of the separate binary bits is omitted in view of well known techniques for data handling in the present state of the art. Thus, throughout the presentation of the system of Fig. 4, it is assumed that appropriate timing is provided for reading out the separate bits of any of the digits referred to, and that by means of either serial or parallel presentation of information, each digit entry comprises the proper number of binary bits. It is obvious to those skilled in the art that the particular manner of coding of information in a computer system is not a necessary feature of the present invention.

For operation of the format control system of Fig. 4, it is necessary to remove information from a bulk memory such as the tape 18. This is accomplished in a conventional manner by a plurality of magnetic reading heads, illustrated diagrammatically by the single reading head 21, if the information is stored in parallel channels upon the tape as indicated by the control signals represented in Fig. 2. In addition to the data, it is presumed that timing signals are recorded on the tape for each of the specified character entries. The separate digits of the character and the timing signals therefore are amplified by means of conventional reading amplifier circuits 23 to provide upon an appropriate pair of output leads 67 and 69, the respective data and timing information. Although not specified in detail for the illustrative system, it is to be presumed throughout the description that the data information such as appearing at lead 67 may be either presented in series or parallel form, in accordance with well known computer techniques, and therefore the indicated lead 67 may comprise a plurality of six leads in case coded information is presented by the six bit binary code groups identified in Fig. 2. For purpose of simplicity, however, single leads are shown and accordingly circuit elements such as gates and mixers are designated with a single input lead or as a single gate, since it is clear that conventional techniques would be employed should variations be made from serial to parallel operation.

Figure 2:
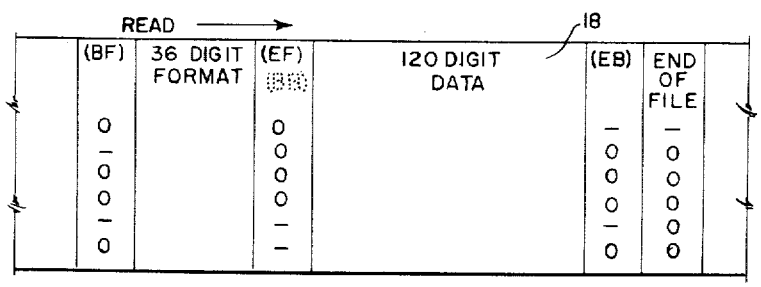
Fig. 2 is a diagrammatic representation of information as recorded upon a magnetic tape.

In order to provide the proper control signals from the data recorded upon the tape as shown in Fig. 2, the decode matrix 70 may be used to produce the tape control signals for the beginning of the block BB, the end of the format EF, the end of the block EB and the beginning of the format BF signals. It is noted that for functional reasons the beginning of format signal BF and the beginning of block signal BB are used identically in most of the control system circuits. These signals are therefore combined in the beginning of block BB control signal which is decoded by the matrix 70. Wherever these different control signals are used throughout the control system the identifying characters will indicate operation by the corresponding decoded control signals.

The format control system presented in Fig. 4 is operated to process format entries and control signals. Thus, the format buffer memory 24 is provided for retaining the maximum thirty-six digit format block in the respective word positions N1 through N9, each storing a four decimal digit word. As hereinbefore indicated, this memory may comprise a magnetic matrix or other similar fast access memory device. Information is entered into the memory system at lead 72, and is removed at lead 73. The address to which the format input information is directed, and from which the removed format information is taken, is specified by an address selector circuit 75. The thirty-six digit address counter 77 is utilized in connection with the address selector circuit 75 to specify the memory location. Well known techniques exist for specifying the address and selecting memory locations in computer systems such as indicated in the October 1953 issue of the Proceedings of the I.R.E. known as the Computer Issue, particularly in the article beginning on page 1407 entitled "A Myriabit Magnetic Core Matrix Memory."

Since it is required that format information be identified upon the magnetic tape 18 for reading into the memory 24, the decoded control signals begin of format BF and end of format EF are used to set and reset respectively a format gating flip flop circuit 79. This circuit in its set position S provides an output signal for actuating the respective timing and data gating (And) circuits 81 and 82 which obtain further input signals from the respective output leads 67 and 69 from the read amplifier circuits 23. Thus, at the beginning of format, the format gating flip flop circuit 79 is set to pass information and is reset at the end of the format to prevent other information from passing through the gating circuits 81 and 82. The data is passed into the format memory input lead 72 by the format input mixer (OR) circuit 84. Likewise, provision is made by the format input mixer circuit 84 to pass information into the format buffer memory 24 from the manual keyboard 26. This manually presented information can only pass through the manual format gate 88 when a state selector 90 is residing in an idling state "0." This prevents the accidental entry by actuation of the keyboard during the processing operations of the data handling system.

In general, the data processing system is operated in several states identified by the state selector 90. The state selector is made to normally count through several states such as 1 to 6 by means of the state counter circuit 92 by appropriate signals occurring during a single line print cycle at block 94. Thus, states 1 through 6 are scanned for each line printed as scheduled by means of appropriate signals available in control circuitry. Proper timing relationship is maintained at the gate circuit 96 by means of computer clock pulses CP. Whenever the print cycle is completed, a signal at the input lead 98 of gate circuit 99 is caused to actuate the state selector preset circuit 101 which sends the state selector into its initial non-idling state "1." The state selector could be set to its idling state "0" by means of a manual push button signal M or the like whenever desired to enter information manually into the format memory system. Certain operations are required which do not specify the preset of the state selector circuit into state "1," where information is read from the tape, such as the multiple print line MPL control signal used to inhibit the passage of information through the gate 99 as indicated at lead 97. Likewise, operation of the gate circuit 99 is properly timed by the presence of an input clock pulse CP. Throughout the operation of the data processing control system and computer, the state selector is utilized to separate several functional sub-cycles during a line print cycle. In the control system of Fig. 4, those operations required during a specific state are so designated by a state signal character. Thus, the manual keyboard may be operated only during the idling state "0" and the tape transport mechanism may be actuated for the reading operation only during state "1" as indicated by the read gate 103.

Although all the format information is read into the thirty-six digit buffer memory 24, one of the format words N1 through N9 also is placed into a four digit format register 66 to supply format control signals used for current operations. In this four digit format register 66, the four format characters F1 through F4 are held for specifying operations as indicated by the discussion in connection with Fig. 3. Thus, the first format digit F1 may specify that a new block of tape should be read should an appropriate decode matrix channel 107 indicate that the digit is one of the numbers from 5 through 9. Thus, this decode format digit will specify during state "5" that a new block of tape should be read as indicated by circuit 109 which provides a read block signal RB. This read block signal is used for two purposes. The first is for assuring that the state selector preset circuit 101 is not actuated to put the computer in state "1" unless it is desired to read a block of information, as dictated by operation of the gate circuit 111. The second control operation is that of sending the tape control flip flop circuit 113 into its set position so that the read gate 103 may be actuated during state "1." The end of the block signal EB is used to reset the tape control flip flop and thereby automatically stop the reading operation at the end of the block until another cycle is initiated.

Thus, the format word currently stored in register 66 is used for the various operations specified in Fig. 3. The four digit format register 66 is filled either by information passing along lead 115 or information removed from the format buffer memory at the output lead 73. Information from these two routings are combined at the mixer circuit 116 for entry into the four digit format register 66. For each operation, the initial format entry occurs during the read operation of state "1" as controlled by the gate circuit 117. This gate circuit is under simultaneous control of one of the timing signals C1, C4 or C7 provided by the address counter circuit 77 which is caused to count progressively through all digits 1 through 36, and to provide control signals C1 etc., during the time that one of the corresponding format words N1 through N9 is entering or leaving the buffer memory circuit 24.

A plugboard entry circuit 121 or other selective switching means is provided in accordance with one feature of the operation so that certain of the format characters may be by-passed. Thus, only three of the nine format words may be entered for initial operation into the format register 66. Thus, the format word signals C1 to C3, C4 to C6, or C7 to C9 respectively signify that only the first, second or third format word groups may be entered into the format register 66 during the read-in operation of state "1" depending upon the connection of plugboard 121. In this manner as many as these separate modes of operation may be scheduled for format control by the plugboard 121. For example, the first sub-group of three format words N1, N2 and N3 may be plugged for a normal billing operation format, the second sub-group of three words N4, N5, and N6, may be specified for a weekly inventory run, and the third sub-group of format words N7, N8 and N9 may be specified for a delinquent account preparation. Thus, the plugboard 121 may indicate during different computer runs, which of the three separated format word groups should be used for each operation. To assure that only the three designated words are read into the format register 66, the third word of each group is always chosen to actuate the decode matrix circuit 107, i.e., the third word in the fifty series, and thereby initiate the reading of a new block of tape. Obviously in the same manner the words could be broken up into the groups of six and three, for example, to perform respective more complex and less complex format control operations such as an account billing operation and a summary ledger run.

During normal operation, the address counter 77 is cycled so that consecutive digits N1 through N9 are read from the buffer memory 24 into the format register 66. Thus, for each printing operation PR at the end of a print cycle, while the system is in state "5," the address counter is stepped through a sequence of four digit pulses by means of sequencing gate 123 to count out the next format word into the format register 66 through the gate circuit 124. The gate circuit 124 and the mixer circuit 125 are shown only to indicate more clearly the sequencing operation for successive reading of the format numbers into the format register 66. Normal control is made through the address selector circuit 75 which functions as shown by gates 124 and 125 to cause information to pass into the mixer circuit 116 only during the counting operation when one of the format word signals C1 through C9 is occurring during state "5."

The counting operation is signified by the block circuit 127 and is controlled by three separate input circuits to the mixer circuit 129. Thus, in addition to the sequencing count from gate 123, a count occurs at lead 131 under control of the manual keyboard 26 when data is manually entered into the memory. Likewise, the timing signals associated with the format characters appearing on the magnetic tape 18 are used to count the address counter through the timing gate 81. Before any operation cycle begins, the address counter is preset to "0" by a signal such as the beginning of block signal BB by means of an appropriate "0" preset means 133. Thus, data is entered into the format buffer memory 24 consecutively in format word positions N1 through N9. This imposes a restriction on this particular system that should it be desired to initiate control with the fourth format word N4 by means of connection C4 at plugboard 121, the initial format word entries N1, N2 and N3 would necessarily be stored in the format block upon the magnetic tape, whether used or not in some other operation. This feature is, however, desirable in view of the simplified control circuits required for this mode of operation.

Whenever the format control is utilized, it is possible that a format entry is designated on the tape for each of the corresponding data entry blocks. However, there may be some computer operation conditions where it is not desirable for changing the format for a series of operations. For example, it might be desirable to print out a series of checks which all have the same format arrangement entered into the system manually or by a recorded format entry and held by a special circuit. This may be done in the illustrated system in two ways as specified by the mixer circuit 136. Thus, a manual control signal M may be used to preset the state selector into a "0" state at preset circuit 101 and to actuate the format hold flip flop circuit 138 into its set position. When the format hold flip flop is in its set position, relay 140 is actuated to change the position of its contacts and thereby interpret the beginning of block signals also as the end of format signals to thus set the format gating flip flop 79 to omit the format entry operation. Thus, it is not required to enter format data upon the tape and the data entries may be consecutively entered to conserve input memory capacity whenever the format entries need not actually be recorded on the tape.

Similar operation occurs for automatic control specified by AC signals at the gating circuit 142. Selection of the desired mode of operation might be provided by one position of a single pole double throw automatic-manual switch which provides alternatively the control signals AC and M. Separate signals for indicating the start of a block of information are used when the format is entered into the block and when only data is entered into the block. Thus, the begin block signal BB, as seen in Fig. 2, would be used only when the format information was not incorporated as might occur for some of the entries in the automatic control mode of operation. The begin of format signal BF thus specifies that a format character is on the tape and would cause the format hold flip flop circuit 138 to be reset and thereby cause normal operation of the format control system to enter a subsequently recorded format entry. However, at the end of the format signal EF the system reverts to the automatic mode of operation when an automatic control signal AC is entered at gate 142 to cause the format hold flip flop circuit 138 to be set. If a single format word is used it will be held in register 66 by operation of the inhibit gate 144 which prevents its normal cycling as the print operation takes place in state (5). Likewise, the begin block signals are interpreted as the end of format signals by the format hold flip flop 138 in the control circuit to assure that none of the data information is entered into the format buffer memory 24 during the time that the tape is read. In this mode of operation the begin format signal BF and the begin block signal BB are used in the usual manner for the same control functions are therefore merged at the output decode matrix 70.

In operation, therefore, it is clear that the format hold flip flop 138 permits the control system of Fig. 4 to read a single format entry designated by a begin of format signal BF into the format memory 24 and cause the first, fourth or seventh word to be held in the format register 66 for performing the same format operation upon a series of successive data entries designated by a begin block input signal BB until the appearance of a further format signal on the tape preceded by a begin format entry BF which will designate a change in format for a series of successive operations. Thus, the efficiency of storage upon the bulk tape memory need not be impaired by the appearance of a group of successive entries which require the same format operation.

It is noted that a different mode of automatic control circuit operation is necessary when more than one format word is to be used for operation on a block of data information during several printing cycles. In this case, the plugboard 121 could be used to designate whether 3 6 or 9 format words were necessary for designating the proper control action, and the format hold inhibit gate 144 would be omitted, since the normal stepping of several words during different print cycle operations would be desired. The address counter 77 is automatically reset for further cycling by the begin block signal BB at the preset circuit 133 so that the format entry may be recalled in proper order for subsequent data entries. It is clear from the foregoing operations, therefore, that it is possible with the presently described format control system to provide improved operation of data processing systems whenever it is desired to arrange data from successive stored data entries on output documents in multiple patterns.

Figure 5:
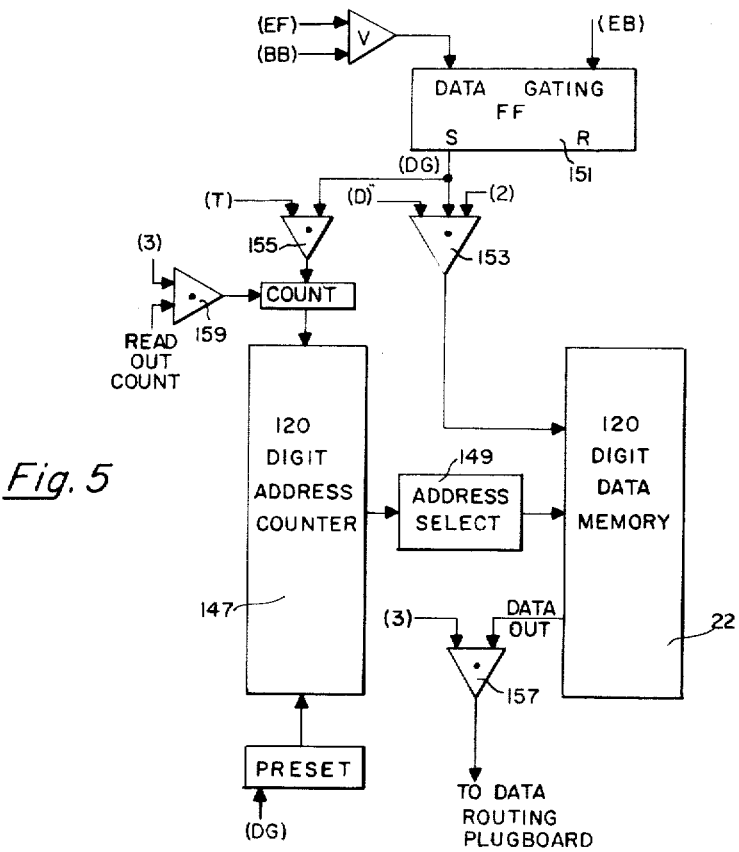
Fig. 5 is a block system diagram indicating the data buffer memory and processing circuit.

A simplified data processing control system is shown in Fig. 5 for reading the data information from the tape 18 into the one hundred twenty digit data buffer memory 22. In this control circuit, a data address counter 147 is used with the address select circuit 149 similarly to the format memory and address counters. Data is thus read into the one hundred twenty digit memory in response to data signals D and timing signals T from the magnetic tape 18 upon actuation of the data gating flip flop 151 into its set position by the end of format control signal EF or the begin of block control signal BB seen upon the tape 18 of Fig. 2. The data gating flip flop is reset at the end of the block signal EB to prevent further spurious entry of information into the buffer memory 22. The data is entered into the memory in state (2) by means of the data gating circuit 153. Likewise, the data counting gate 155 uses timing signals from the tape to step the address counter through the address selection. The address counter is preset at the beginning of the read-in operation by the data gating signal DG provided at the set terminal of the data gating flip flop 151. Data is removed from the buffer memory 22 at the output gate 157 during the state (3) operation of the computer. A further counting operation is provided at the address counter by appropriate control signals at the read out counting gate 159 during state (3) whenever appropriate read out count instructions are sent to the address counter. Operation of this type of circuit is illustrated in the above mentioned I.R.E. publication, and other modes of selection of address for the one hundred twenty digit data memory may be employed for read out, such as the possibility of parallel read out from a one hundred twenty digit shift register system, if desired. This sort of read out is exemplified in the format control plugboard of Fig. 6. It is clear, therefore, that data may be entered from the tape into the buffer memory 22 and removed therefrom whenever desired during the data processing cycle for entry into an output document preparation device such as a printer or punch.

In Fig. 6 the manner in which the stored four digit format word in register 66 operates to produce the required control functions, is exemplified by decoding the digits F1—F2 and F3—F4 of the format word separately as shown in Fig. 2. Thus, the decode matrices 161 and 162 respectively process the corresponding groups of format digits to provide at various output lines information for directing respectively the miscellaneous line spacing and document processing operations, and the arrangement of data characters along a line. In decoding matrix 161, the first two format word characters F1 and F2 are separated to provide the instructions for feeding the card the proper number of lines, and other document control functions. It is obvious that these characters could specify with different output printer or punch systems other functions than those contained herein with equal facility, and since conventional card punches and printers have control circuits for spacing from one line to another, for entering and ejecting cards etc., it would be pointless to the understanding of the present invention to go into the unnecessary control details of these devices.

In order to process data from the register 22 to the proper line position in the printer 30 or punch 32, the decode matrix 162 produces output signals on any one of fifty output leads specified by the format characters F3 and F4. A section of the plugboard data routing operation including detailed connections is shown in Fig. 7. Each of the gating circuits 165 is conventional in operation in that a gating signal such as provided at the 120 volt bus, when connected to the corresponding input terminal 167 of a respective column of gates, will permit information to pass from an input diode terminal 169 to an output diode terminal 170 of any gate in the columns. Alternatively the grating circuits 165 could be replaced by a relay circuit with the solenoid actuated by a signal at terminal 167 and with closable contacts between terminals 169 and 170.

Thus, consider operation of format selection relay contacts at the position 2 in response to the receipt of the format instruction 02 or 52 by decode matrix 162 and its effect upon the format of an output document. Since operation of the format selection relay contacts at the position 2 couples the 120 volt bus to the input terminal 167' of the first column of gating circuits 165, it will function to pass information from data register character positions 2, 4 and 6 of the storage buffer 22 respectively to printing positions 2 and 5 of the print station 30 and punching entry 3 of the punch station 32. Because of the arbitrary provision of eighty groups of six data routing gates, a large number of selections may be made in the same manner for operation by any format selection relay. It is understood that each of the positions 1, 2, 3 . . . 120 of the storage buffer 22 stores at least six bits of information. By closing a further format selection relay contact 4 coupled to the input terminal 167″ at the second column of gates, a different format function is provided, namely that the data register character 120 will be routed to the print entry line 5. Thus, it is seen that information from the data buffer memory 22 may be entered at two different positions along the same line or may be printed in the same position along the line in two different printing cycles depending upon the instructions provided by the corresponding format designation characters. After the data routing plugboard is once connected for operation, the characters contained in the format register thereby specifically determine a particular form of output document presentation. Because of use of the plugboard 28, the format selection is extremely flexible and yet a minimum amount of information need be carried by the tape format control signals for direction of automatic operation of the processing system to produce the desired printing or punching format.

It is, accordingly, evident from considering the foregoing discussion of the invention and its operation that a compact and efficient yet flexible data routing system is provided with permits the transfer of information from bulk memory storage to output document form with a maximum amount of flexibility and a minimum amount of bulk storage capacity and computer or data processing equipment. Therefore, those novel features which are believed descriptive of the invention are defined with particularity in the appended claims.

We claim:

1. In apparatus for processing data stored in memory storage means and for producing documents, the combination comprising: serially presentable entries in said memory storage means representing both a data entry and a format control entry specifying the format arrangement of said data entry; means having a plurality of recording positions for producing an information bearing document including recording means individual to different ones of said positions to record on said document at selectable positions thereon; means for transferring information from said data entry of said memory storage means to a document, said means for transferring including a plurality of electrical information paths operably coupled to said recording means at designated recording positions; and control circuit means responsive to said format control entry and actuatable thereby to select certain of said electrical information paths and to connect said memory storage means to said recording means over said selected electrical information paths, whereby documents may be produced having formats differing from one another.

2. In a system for producing documents from stored information, an advanceable storage medium having for each document an information block containing a data entry and further having on said storage medium a second information block containing a format entry; the format entry of said second block specifying in coded form a plurality of format control operations including the control of the spacing of lines recorded on the document, the control of the positioning of the characters recorded on the document, and the control of the advancement of the storage medium; and means for transferring information from said data entry block to a document; said last mentioned means including means operatively associated with the storage medium and having a plurality of information channels leading therefrom, recording means for producing an information bearing document, and control circuit means responsive to the information in said block containing the format entry and actuatable thereby to select certain ones of said information channels and connect the same between said storage medium and said recording means whereby successive documents may be produced having formats differing from one another.

3. An accounting system for producing documents from stored information comprising, in combination, an elongated tape-like storage medium having longitudinally separated portions whereof each portion is sub-divided into a block containing data to be recorded on one or more documents and a second block containing format control entries for signifying the format of the data to be recorded, the format entries of each of said second blocks specifying in code a plurality of different format control operations including the spacing of lines recorded on the document and the control of the positioning of the characters recorded on the document; means operatively associated with the storage medium for establishing a plurality of presettable information conveying channels leading from the storage medium; channel selecting means under control of the information in said blocks of format control entries of the storage medium for selecting one or more but less than the total number of said information conveying channels; recording means for printing data upon the documents; and means operatively connecting said recording means to said information channels in accordance with the channels selected by said channel selecting means for controlling the format of the recording upon the documents.

4. The combination as defined in claim 3 including punching means for punching data upon the documents, and means operatively connecting said punching means to said information channels in accordance with the channels selected by said channel selecting means for controlling the punching upon the documents.

5. The combination as defined in claim 3 wherein a further format control entry controls the positioning of the characters recorded on the document and controls the printing of the same information upon different portions of the same line.

6. The combination as defined in claim 3 wherein a further format control entry controls the positioning of the characters recorded on the document and controls the printing of the same information on different lines.

7. In an accounting system for making billing entries on severable portions of documents, an advanceable elongated tape-like storage medium having longitudinally spaced portions thereof each containing a block of format control orders for signifying the format of data to be recorded on the documents and a second block of billing entries to be recorded on the documents, the format orders of each of said first blocks specifying in code the position of the billing entries to be recorded on the severable portions of each of the documents; a plurality of information conveying channels operatively connected to the storage medium and through which the data to be recorded on the documents are conveyed; means responsive to said format control orders of each of said first blocks of the storage medium for selecting those information conveying channels operable to make the same billing entries on the severable portions of each of the documents; recording means for marking data upon the documents; and means operatively connecting said recording means to said selected information conveying channels and determining the position of the same billing entries upon the severable portions of each document in accordance with the selected information conveying channels.

8. The combination as defined in claim 7 wherein said recording means includes further means for producing a utility billing run and a daily entry journal as the documents are so marked.

References Cited in the file of this patent

UNITED STATES PATENTS

| 2,549,071 | Dusek | Apr. 17, 1951 |
| 2,605,879 | O'Halloran | Aug. 5, 1952 |
| 2,708,267 | Weidenhammer | May 10, 1955 |
| 2,764,750 | Wright et al. | Sept. 25, 1956 |